March 7, 1944.   D. T. MANNING ET AL   2,343,238
METHOD OF PRODUCING ARTICLES FROM THERMOPLASTIC MATERIAL
Filed Dec. 31, 1940

INVENTORS
DANIEL T. MANNING &
WILLIAM T. MANNING Jr.
BY
ATTORNEY

Patented Mar. 7, 1944

2,343,238

UNITED STATES PATENT OFFICE 2,343,238

METHOD OF PRODUCING ARTICLES FROM THERMOPLASTIC MATERIAL

Daniel T. Manning and William T. Manning, Jr., Rochester, N. Y.

Application December 31, 1940, Serial No. 372,588

1 Claim. (Cl. 18—58)

This invention relates to the manufacture from thermo-plastic material of articles having parts thereof arranged transversely angular to the body portion thereof and the invention has for its principal object to provide a novel method which simplifies the molding of such articles and materially reduces the cost of the molds necessary for such articles.

Another object of this invention is to provide a novel combined molding and shaping method from thermo-plastic material for the manufacture of articles such as decorative figures.

These and other objects and attendant advantages of this invention will become more readily apparent from the detailed description thereof which follows, reference being had to the accompanying drawing in which Figure 1 is a detail perspective view of one of a pair of die blocks used in carrying out the novel method.

Figure 1:
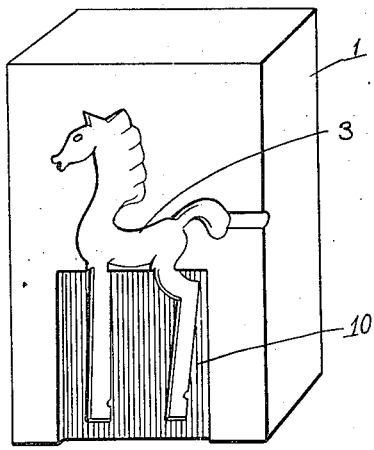
Figure 2:
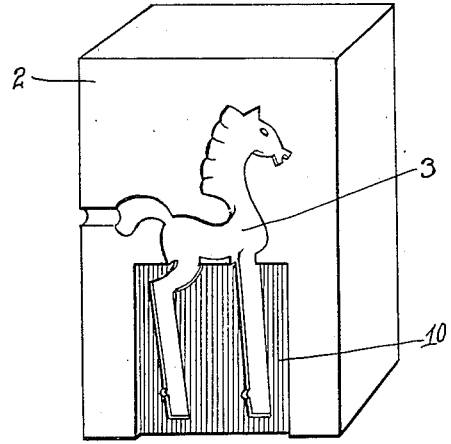
Figure 2 is a detail perspective view of the other of the pair of die blocks used in carrying out the novel method.
Figure 3:
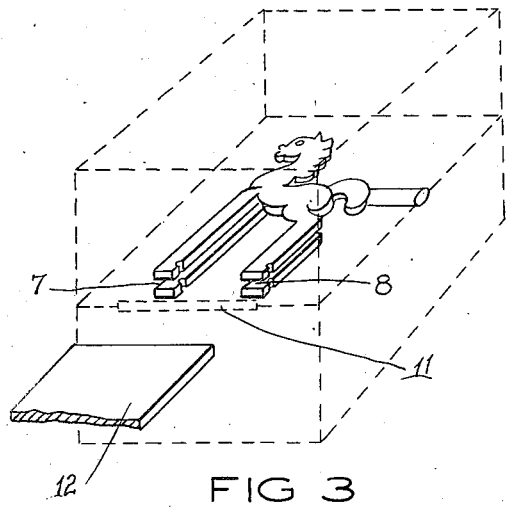
Figure 3 is a phantom perspective view of the pair of die blocks brought together for the moulding operation and illustrating the manner in which the article or figure is cast therebetween.

In carrying out the invention, either the injection or the compression molding process may be used as long as means are provided in the mold used in the process which permit the molding of substantially parallel members of the article which are held divided by a space extending in a plane substantially parallel to the members. This is illustrated in Figures 1 to 3 of the drawing in which reference numeral 1 indicates one of a pair of die blocks and 2 indicates the other or supplementary die block. The cavity 3 in each of the die blocks represents the article to be molded therein and the cavities are so arranged in their respective die blocks that when brought together they provide a complete mold for the article to be cast therein.

As above stated the new method is useful for articles which are provided with members which project transversely angular to the body portion of the article. Such an article, for example, is the horse 4 illustrated in Figure 5 which is provided with the angularly projecting front legs 5, 5 and the rear legs 6, 6. In the ordinary method of completely forming a figure of this kind by a casting or molding process, the die blocks would have to be provided with a cavity between two or more die blocks that will cast or mold these legs in their final angularly projecting formation. Die blocks of this kind would be extremely difficult and costly to produce first because of the manner in which the mold would have to be divided between die blocks so as to permit a practical withdrawal of the cast figure from the mold and second because of the increased cost of the set of die blocks necessary for this purpose.

To overcome this, the present invention provides for the molding of the figure with all of its parts arranged in parallel planes. For this purpose the cavities 3, provided in each die block, are cut to produce half of the figure which locates the dividing line of the two cavities in the die blocks in a plane which longitudinally extends thru the middle of the figure. This reduces the cost of the die blocks to a minimum and provides for a quick and easy removal of the molded figure on the separation of the die blocks.

Figures 4, 5:
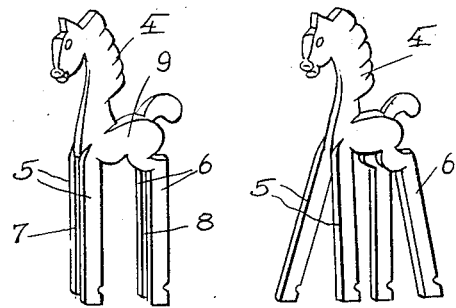
Figure 4 is a detail perspective view of a figure in the form in which it is cast or molded in the mold provided by the die blocks.
Figure 5 is a perspective view of the figure after it is shaped into its final form.

In order to provide for the formation of the projecting legs of the figure, the leg portions of the figure molded in the die blocks are divided by spaces 7 and 8 respectively which extend between the legs 5 and 6 from their outer ends to the body portion 9 of the figure. A figure molded in this manner is illustrated in Figure 4. To provide for the spacing of the legs, each die block has a shallow cutaway section 10, 10 which covers a rectangular area surrounding the leg portions of the cavity which extends from one end of each die block adjacent to the body portion of the cavity. When the die blocks are brought together, as illustrated in dotted lines in Figure 3, the cutaway sections 10, 10 are superimposed and together form a slot 11 for the insertion of the arbor 12. The latter, when inserted completely fills the cutaway sections 10, 10 and temporarily separates the leg portions of the cavity in one die block from the leg portions of the cavity in the other die block. By filling the mold with the thermo-plastic material in the molding operation the spaces 7 and 8 are thus provided between the legs 5 and 6 respectively. To remove the molded figure from the mold, the arbor 12 must be withdrawn from between die blocks so as to permit the figure to be lifted from the cavities on the separation of the die blocks.

A figure thus molded then has its leg members made plastic substantially at their junction with the body portion of the figure and this is accomplished by a suitable application of heat at this point. With the leg members in a plastic state, especially at their junction with the body of the figure, the legs are readily bent and shaped into angular position relative to the body of the figure and to each other to complete the figure by providing it with an animated appearance.

While the invention is illustrated and described for the purpose of producing a figure, it is understood that the novel method may be used for any other article in order to reduce the cost of the dies and simplify the forming of such article.

I claim:

The method of producing a cast figure from thermo plastic material which consists in casting a substantially flat thin body of substantially uniform thickness having spaced projecting portions, then making plastic the junctions of the projecting portions of the figure with the body of the figure by the application of heat at said junctions and bending said portions at said junctions transversely to the body and away from each other to complete the figure.

DANIEL T. MANNING.
WILLIAM T. MANNING, Jr.